G. H. HUMPHREY.
VEHICLE FRAME.
APPLICATION FILED APR. 11, 1912.

1,069,334.

Patented Aug. 5, 1913.

WITNESSES:

INVENTOR.
Geo. H. Humphrey
BY John H. Roney
his ATTORNEY

UNITED STATES PATENT OFFICE.

GISE H. HUMPHREY, OF WILKINSBURG, PENNSYLVANIA.

VEHICLE-FRAME.

1,069,334.  Specification of Letters Patent.  Patented Aug. 5, 1913.

Application filed April 11, 1912. Serial No. 689,954.

*To all whom it may concern:*

Be it known that I, GISE H. HUMPHREY, a citizen of the United States, residing at Wilkinsburg, in the county of Allegheny and State of Pennsylvania, have invented a new and useful Improvement in Vehicle-Frames, of which improvement the following is a specification.

My invention relates to improvements in vehicle frames and is particularly applicable to vehicles of the automobile type.

The object of the invention is to produce a construction of frame whereby the shock transmitted to the vehicle body when the vehicle passes over uneven surfaces is minimized, and the vibrations that follow the shock usually when the vehicle is mounted upon spring supports is entirely eliminated, and in addition to these advantages the beauty of the car frame is enhanced. I accomplish these several objects by means of the device more specifically described, reference being had to the accompanying drawings forming part hereof, in which—

Figure 1:
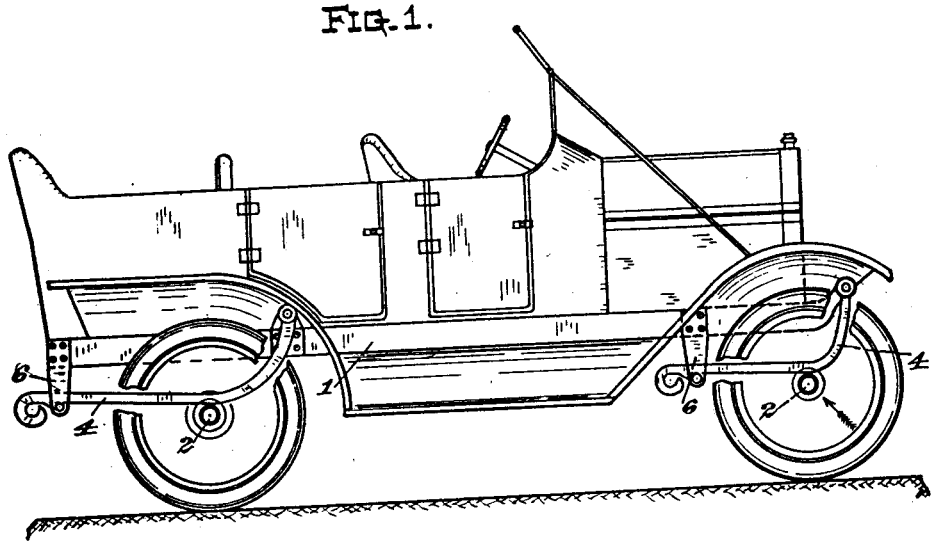
Figure 2:
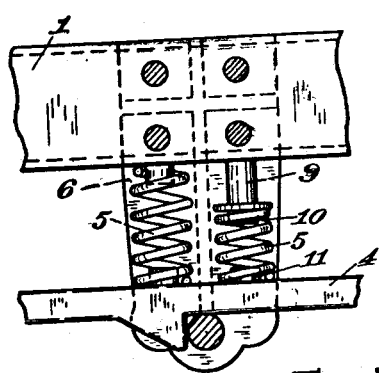
Figure 3:
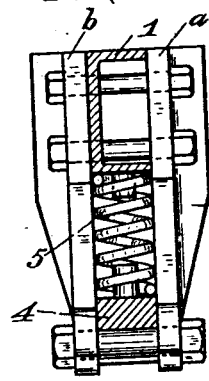
Figure 4:
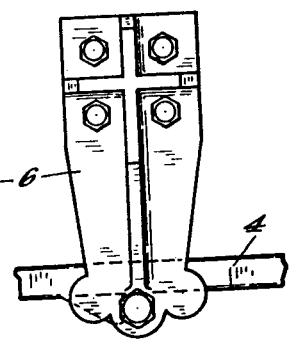
Figure 5:
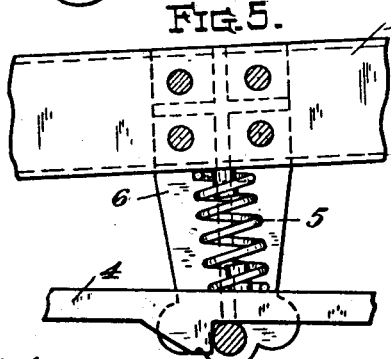
Figure 6:
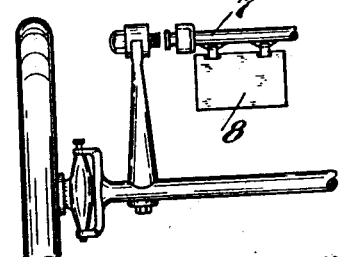

Figure 1 is a side elevation of an automobile with my improvement applied thereto. Fig. 2 is a longitudinal sectional view through the keeper within which the rear end of the pivotally mounted shock absorbing bar is loosely received. Fig. 3 is an end view of the keeper. Fig. 4 is a side elevation of the keeper. Fig. 5 is a view similar to Fig. 2, showing a modified construction in which but a single spring is employed, and Fig. 6 is a front elevation of one side of the running gear.

Referring to said drawings, 1 is the side rail of the frame of the car.

2, 2 are axletrees whereon are mounted the car frame and body.

4 is what I term a shock receiving and transmission bar, the forward end of which is pivotally secured at a point above the horizontal plane of the side rail of the frame, the forward end of said bar being preferably curved from its pivotal connection to a point to which it is secured to the axletree 2, 2, the extension of said bars beyond this point being preferably slightly upwardly inclined, the free end thereof extending rearwardly of the axletrees and passing beneath a spring or springs 5, 5, or other resilient members, which are mounted on the brackets 6. The said brackets comprise two plates or pieces *a*, *b*, bolted or otherwise secured upon the side rails of the car near the front and at the rear of the same, both of said brackets being arranged rearwardly of the wheels. The free ends of said bars 4, 4 may be curved as shown on the drawing to add finish to the structure.

7 is a rod secured in the curved front end of the car frame and extending transversely of the same, to which the license plate 8 may be suspended if desirable.

The operation of my device is as follows: The shock or jolt occasioned by the passing over uneven surfaces is transmitted approximately in a line indicated by the arrow. This will have a tendency to throw the wheel contacting with the obstruction in the direction indicated by the arrow, thus transmitting the shock to the bars 4, the upward movement occasioned by the shock swinging the bars on their pivotal connections, thus transmitting the shock to the springs or other resilient member acting thereon and compressing the same. In the form of device two springs may be utilized as indicated in Fig. 2 of the drawings. The shock if very great might compress one of the springs almost completely. The other spring, however, being shorter, acts as a reinforcing spring. The upper end of the short spring 5 receives and loosely engages the positioning and guiding stud 9 which terminates in a rubber nose 10, while the lower end of the spring receives and is positioned by a rubber stud 11. This rubber stud 11 is adapted to engage the rubber nose 10 of the upper positioning stud 9 when both of the springs are compressed to the maximum extent. After the car passes over the obstruction and in coming to normal position swings upon its pivotal connection with the bars 4 the distention of the springs forces the free ends of the bars into normal position, thus bringing the car to normal position upon the pneumatic wheels and preventing the vibration which always accompanies a shock when the car body is suspended upon spring supports of the ordinary type. It is noted that the forward ends of the side rails of the frame are carried up in a curved line above the normal horizontal line thereof and that the pivotal connections of the bars 4 secured upon the rear axletree are likewise carried up above the normal horizontal line of the side rail. This construction permits a very ready upward movement of the axletrees upon the pivotal connections securing the frame upon said bars. The advantages of my construction will be obvious to those skilled in the art to which it appertains. It may further be pointed out that when the wheel strikes an obstruction the shock absorbing bar 4 is swung rearwardly about its pivotal connection with the main frame so as to carry the wheel rearwardly and simultaneously permit the body of the vehicle to travel forward a slight amount with respect to the wheel. As soon as the obstruction has been passed, the wheel and vehicle body will again resume normal position, although the relative forward movement of the vehicle body with respect to the wheel is of very great advantage in absorbing the shock.

If desired to minimize still more the tendency to vibration in the structure in coming to normal position after shock, friction disks may be interposed between the bars 4 and the bearings at the pivotal connection thereof.

Having described my invention, what I claim and desire to secure by Letters Patent is:

1. In a device of the character described, the combination of a frame including side pieces which are formed with upwardly projecting brackets, shock absorbing bars arranged under the frame and disposed in pairs on opposite sides thereof, the forward ends of the said shock absorbing bars being extended upwardly and carried above the side pieces of the frame where the extremities thereof are pivotally connected to the before mentioned brackets, keepers extending downwardly from the side pieces of the frame and loosely receiving the rear ends of the shock absorbing bars, cushioning means engaging the said rear ends of the shock absorbing bars, and an axle tree carried by each pair of the shock absorbing bars.

2. In a device of the character described, the combination of a frame formed with side pieces, shock absorbing bars disposed in pairs and arranged under the frame, the forward ends of the said shock absorbing bars being extended upwardly and pivotally connected to the frame at a point above the plane thereof, keepers projecting from the side bars of the frame and loosely receiving the rear ends of the shock absorbing bars, an axle tree carried by each pair of the shock absorbing bars, and a plurality of shock absorbing elements engaging the free end of each of the pivotally mounted bars and constructed to be brought successively into action as the pivotally mounted bars are swung upwardly.

3. In a device of the character described, the combination of a main vehicle frame, a pair of shock absorbing bars arranged under the frame on opposite sides thereof, the forward ends of the said shock absorbing bars being extended upwardly and pivotally connected to the main frame at a point above the plane thereof, an axle tree carried by the shock absorbing bars, and cushioning means between the rear ends of the shock absorbing bars and the frame.

In testimony whereof, I have hereunto signed my name in the presence of two subscribing witnesses.

GISE H. HUMPHREY.

In the presence of—
LOYD W. HUMPHREY,
HERBERT B. ELLISON.